United States Patent [19]

Pascal et al.

[11] Patent Number: 4,677,354

[45] Date of Patent: Jun. 30, 1987

[54] DEVICE FOR REGULATING THE SPEED OF AN ASYNCHRONOUS ELECTRIC MOTOR

[75] Inventors: Jean-Pierre Pascal; Jean-Luc Giovachini, both of Paris; Jacques Croizier, Saint-Etienne, all of France

[73] Assignee: Etat Francais represente par le Delegue general pour l'armement, France

[21] Appl. No.: 745,955

[22] Filed: Jun. 18, 1985

[30] Foreign Application Priority Data

Jun. 18, 1984 [FR] France .................. 84 09473

[51] Int. Cl.⁴ ................................ H02P 5/24
[52] U.S. Cl. .................. 318/153; 318/135; 318/687; 318/799
[58] Field of Search ............ 318/303, 306, 327, 329, 318/147, 148, 151, 152, 153, 154, 156, 135, 687, 799, 800

[56] References Cited

U.S. PATENT DOCUMENTS

| | | | |
|---|---|---|---|
| 2,989,684 | 6/1961 | Smerillo et al. | 322/23 |
| 3,022,453 | 2/1962 | Jones | 318/154 |
| 3,265,947 | 8/1966 | Woehler | 318/148 X |
| 3,551,685 | 12/1970 | Corry | 318/148 X |
| 3,639,820 | 2/1972 | Stemmier | 318/148 X |
| 3,686,550 | 8/1972 | Cummings | 318/157 X |
| 3,934,184 | 11/1976 | Bonig et al. | 318/327 X |
| 4,143,280 | 3/1979 | Kuehn, Jr. et al. | 318/147 X |

Primary Examiner—Benjamin Dobeck
Attorney, Agent, or Firm—Parkhurst & Oliff

[57] ABSTRACT

The device comprises a variable frequency AC generator with means of exitation supplied by means for controlling exitation current, means for regulation of the frequency of the generator as a function of an index value, means for measuring actual speed of the mobile portion of the motor, and means for comparing actual speed with the index value. According to the invention, the means for controlling the exitation current are connected to the means for comparing actual speed with the index value, and the generator has a high internal reactance.

8 Claims, 5 Drawing Figures

DEVICE FOR REGULATING THE SPEED OF AN ASYNCHRONOUS ELECTRIC MOTOR

TECHNICAL FIELD

This invention relates to a device for regulating the speed of an asynchronous electric motor, specifically, a linear induction motor.

BACKGROUND OF THE INVENTION

It is now common practice to use asynchronous electric motors and more specifically linear induction motors to move an object, in particular a vehicle travelling along a rail. However, the regulation of the speed of such a motor remains a problem, especially when speed must be maintained with great percision at a given level.

Generally, motor speed is controlled by regulating the frequency of the motor's supply.

For this purpose it has been proposed to use an inverter with an electronic device ensuring highly precise regulation of the frequency. However, the inverter and its related electronic devices are generally expensive and become prohibitive when they are intended to supply a high power asynchronous motor which is intended to drive heavy vehicles or is subjected to severe breaking, as is the case for example with submersible platforms used in a hydrodynamic test.

Systems have also been built in which the asychronous motor is powered by an alternator which is in turn is driven by a DC motor, thus permitting variations in the rotational speed of the alternator and thus of the asynchronous motor's power supply frequency. In this case, regulation is obtained by comparing the actual speed of the vehicle with a desired speed value, and by modifying the motor DC power supply as a function of the difference noted in the comparison. It is difficult however to obtain precise regulation of the speed of the asynchronous motor because of the inertia of cascaded electro-mechanical machines (D.C. motor-alternator).

Regulating speed by regulating the voltage of the power supply has also been tried. However, attempts of this type have been frustrated by the difficulty encounted in trying to rapidly vary power supply voltage, alternators being generally built to deliver steady voltage and having, for this reason, low internal reactance resulting from: the bulking character of magnetic circuits, the large space between the rotor and the stator, and the presence of devices for damping voltage fluctuations such as, for example, short circuits on rotor windings. Once again, rapid regulation of the speed of the motor and the object connected to it thus remains limited.

SUMMARY OF THE INVENTION

One goal of this invention is to produce a device for regulating the speed of an asynchronous motor whose response time is very short, and which makes it possible to deliver power with a very rapid rate of change to the asynchronous motor.

To obtain this goal, this invention offers a device for regulating the speed of an asynchronous electric motor which includes a fixed part and a mobile part and which includes a variable frequency AC generator equipped with an exitation capability supplied by means controlling an exitation current, a generator mechanical drive, means for regulating the frequency of the generator as a function of an index value, means for measuring the actual speed of the mobile part of the motor and means for comparing actual speed with the index value, characterized in that in exitation current control means are connected to the means for comparing actual speed with the index value, and in that the generator has high internal reactance.

Because of the generator's high internal reactance, fluctuations in the exitation current resulting from the difference signal emitted by the comparison device result in rapid fluctuations in the current furnished to the asynchronous motor by the AC generator and this results in rapid rates of change of the thrust produced by the asynchronous motor. Motor speed is thus made to change rapidly.

One of the advantages of the invention is that the AC generator's high internal reactance is obtained through a rotor comprising a laminated magnetic circuit, a small space between the generator rotor and stator and the elimination of any damping element on the generator's rotor. In practice it is preferable for the generator to be an asynchronous motor mounted as a generator.

Another advantage of the invention is that the exitation current controls are mounted down-line from the means used for comparing actual speed with the index value and/or connected to the means used for determining the drag of the mobile part of the asynchronous motor. Thus, the signal indicitave of difference between actual speed and index value speed is modulated so that the deviation of the generator's exitation current is a linear function of the difference between actual speed and the index value.

A further advantage of the invention is that the exitation current controls are connected downstream from the means for comparing actual speed with the index value, to the means used for determining acceleration in the mobile part of the asynchronous motor. Thus, the deviation signal resulting from the means of comparison is modulated in order to avoid excessively rapid fluxuations in the exitation current which would cause current surges in the asynchronous motor.

Furthermore, preferably the exitation current controls should be connected to current detectors at the generator output, with these means comprising means for instantaneous current detection and means for determining the average effective value of these currents. Thus, the AC generator's exitation currents are stablized.

Other characteristics and advantages of the invention will be apparent from the following description of a non-restrictive example which refers to the attached drawings.

DETAILED DESCRIPTION

Figure 1:
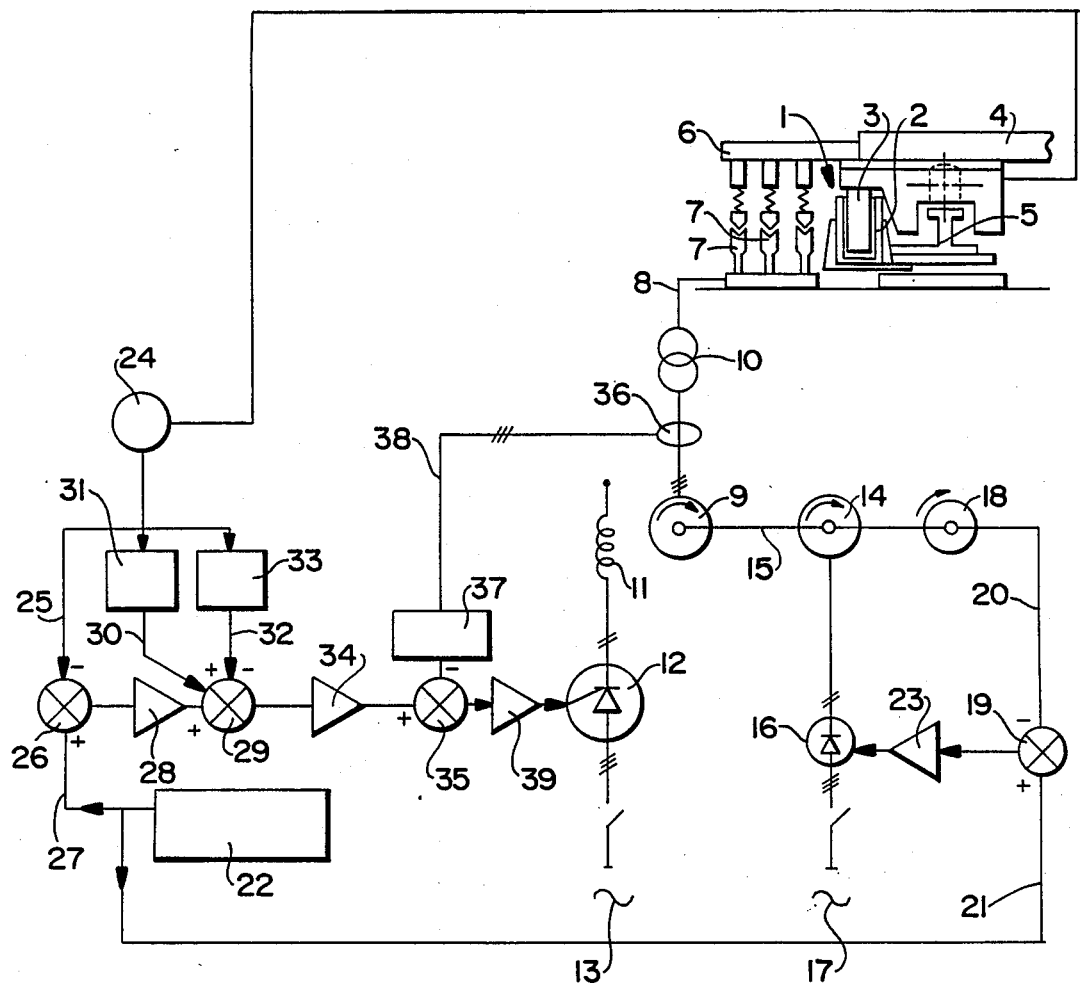
FIG. 1 is the schematic representation of the regulation device.

With regard to FIG. 1, the asynchronous motor 1, in this case a linear induction motor, comprises a fixed portion formed by a secondary rail 2 and a mobile portion formed by a series of inductors 3, resting on an object which is to be moved. In the case shown, the object to be moved is a partially represented platform 4 supported by a rail 5. The inductors 3 are connected through a bracket 6 to brush plates 7, which are in turn connected by a cable 8 to a variable frequency AC generator 9 by means of a transformer 10.

The generator 9 comprises means of exitation formed by a coil 11, which is supplied by controls for an exitation current formed by a thyristor 12 connected to a AC source 13.

The variable frequency AC generator 9 is driven by a DC motor 14 by means of a shaft 15. The DC motor 14 is itself supplied by a DC source formed by a thyristor 16 connected to an AC source 17.

The means used for regulating the frequency of the variable frequency AC generator 9 consists of a tachometric dynamo 18 mounted on the shaft 15 and connected to an inverting input of a summation element 19 by a line 20. A non-inverting input of the summation element 19 is moreover connected by a line 21 to means for establishing a speed index value 22, for example a computer determining the speeds at which the platform 4 should be maintained during test. The output of the comparator 19 is connected to the triger of the thyristor 16 by means of an amplifier 23.

The means for measuring the actual speed of the mobile portion 3 of the motor 1 consists, for example, of a tachometric dynamo 24 represented separately in FIG. 1, for purposes of convenience, but normally affixed to the platform 4 and comprising a roller resting on the rail 5.

The tachometric dynamo 24 is connected by a line 25 to an inverting input to a summation element 26 of which a non-inverting input is connected by a line 27 to means 22 for determining the index value. The summation element 26 thus carries out comparisons of the actual speed of the mobile portion 3 (and thus of the platform 4) of the asynchronous motor 1 with the index value 22.

The decrepency signal E emitted by the summation element 26 is amplified by an amplifier 28. Preferably the amplifier will be of double alternation saturation type. The output of the amplifier 28 is connected to one non-inverting input of a summation element 29. A second non-inverting input of the summation element 29 is connected by a line 30 to means 31 for determining the drag of the mobile portion 3 of the asynchronous motor 1 and of the platform 4 which it drives. The means 31 for determining the drag of the mobile portion 3 of the asynchronous motor are connected to the tachometric dynamo 24 and determine drag by computations based on measured speed for example by using the formula $A + B V^2$ where A and B are constants predetermined as a function of the platform profile 4.

An inverting input of the summation element 29 is connected by a line 32 to means 33 for determining the acceleration of a mobile portion 3 of the asynchronous motor 1 and of the platform 4 which it drives. Acceleration 33 is determined by means for a computer whose input is connected to the tachometric dynamo 24 and which derives acceleration from measured speed. The summation element 29 comprises, in a manner which itself is known, the means for furnishing at its output a magnitude which is representative of a positive current (or nil if the algebraic sum of the input is negative, as would be the case, for example, for deceleration). The output of the summation element 29 is connected to the input of an amplifier 34 whose output is connected to a non-inverting input of a summation element 35. An inverting input of the summation element 35 is connected to a current detection unit (that is, of the current for each phase) at the AC generator 9 output. This current detection unit comprises means for the detection of instaneous currents consisting of a current captor 36, for example, a current transformer placed around the cable 8 connecting the AC generator 9 to the asynchonous motor 1, and a system 37 for determining the average effective value of currents (by intergration of the instaneous value) connected to the captor 36 by a line 38.

The output of the summation element 35 is connected to the trigger of the thyristor 12 by means of an amplifier 39.

So that current fluctuations in the cable 8 may be very rapid in response to current fluctuations in the coil 11, the generator 9 is of high internal reactance type. This high internal reactance is obtained in particular by using a generator with a laminated rotor, a small space between the rotor and the stator, that is, a space of five millimeters or less, and by not using a damper, that is, no short circuit between the rotor windings. In particular, very satisfactory results have been obtained by using an asynchronous motor mounted as a generator.

Figure 2:
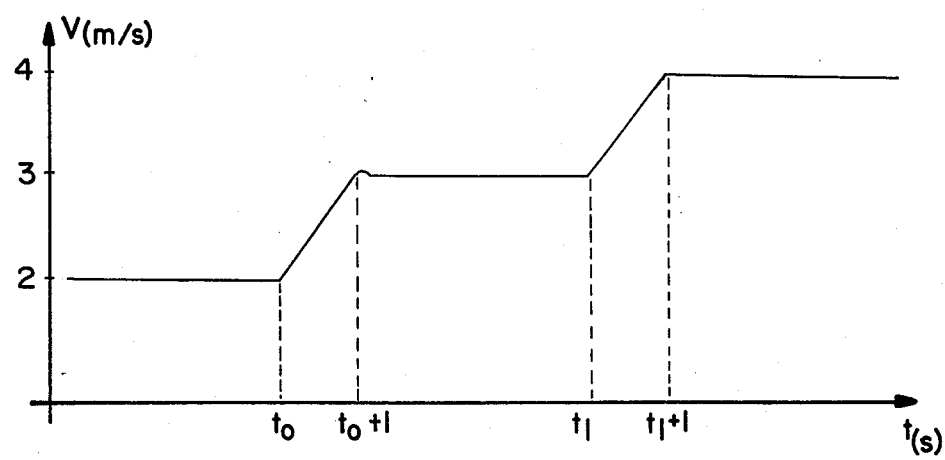
FIG. 2 is the curve representing speed as a function of time.
Figure 3:
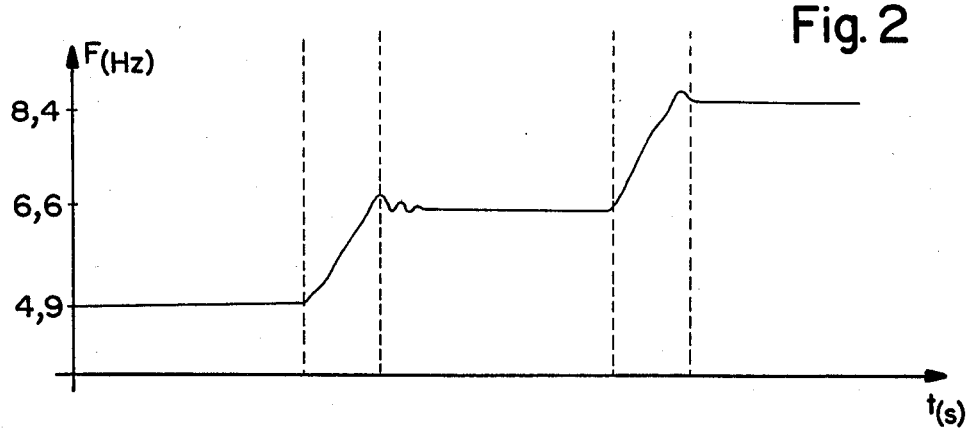
FIG. 3 is the curve representing fluctuation in the frequency of the current furnished by the generator as a function of time.
Figure 4:
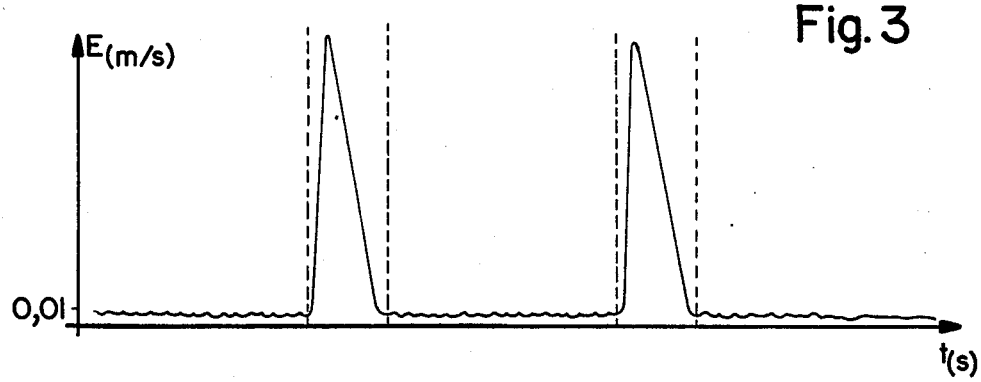
FIG. 4 is the curve representing variations in the deviation signal for the difference between actual speed and index value as a function of time.
Figure 5:
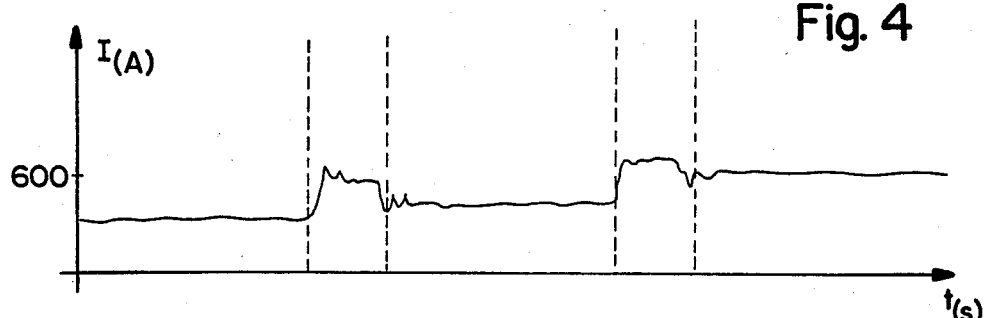
FIG. 5 is a curve representing variations in the voltage produced by the generator as a function of time.

It can be noted in FIGS. 2 through 5 that when the index value changes by reason of an increase in desired speed, the discrepancy signal E at the output of the summation element 26 increases abruptly (FIG. 4) and results in a rapid rise in the frequency F (FIG. 3) of the current I in the cable 8 (FIG. 5) and finally of the speed V of the vehicle 4 (FIG. 2). These curves show that the regulation device permits extremely rapid stabilization of speed.

There is no curve showing the voltage at the terminals of the generator 9. In fact this voltage varies greatly but these fluctuations have no effect on the speed of the motor 1, because of the regulation of the current.

For example, for a submersible platform with a total equipped weight of 8,000 kg, mounted on rails and driven by a 14 pole linear induction motor weighing 700 kg with a thrust of 10 kN (for 5 A/mm$^2$) energized with a voltage of 0 to 55 V with a 0 to 600 A current, it was possible to obtain a steady speed of 6 mm/s to 6 m/s, with differentials of 1 mm/s for a speed of 1 m/s.

This invention is not limited to the embodiment described above and variations may be used.

In particular, the frequency of the alternating current produced by the generator 9 can be controlled by an additional interlock between the summation element 19 and measured speed.

Modulation of the differential at the summation element's 26 output can be modulated by functions other than those described and which serve to damp current fluctuations in the coil 11.

According to this invention, regulation can be achieved with analog signals as well as with digital signals, with of course the necessary adaptation of the means of control for the exitation current.

We claim:

1. A device for regulating the speed of an asynchronous electric motor, the motor including a fixed portion and a mobile portion, said device comprising:
   a variable frequency AC generator with exitation supplied by means for controlling an exitation current, said generator having a high internal reactance,
   means for mechanically driving the generator,
   means for regulating the generator frequency according to an index value,
   means for measuring the actual speed of the mobile portion of the motor and means for comparing actual speed with the index value,
   wherein the means controlling the exitation current are connected to the means for comparing actual speed with the index value.

2. A regulation device as recited in claim 1, wherein the AC generator comprises a rotor with a laminated magnetic circuit.

3. A regulation device as recited in claim 1, wherein the AC generator comprises a stator and a rotor separated by a space of not more than five millimeters.

4. A regulation device as recited in claim 1, wherein the AC generator is an asynchronous motor mounted as a generator.

5. A regulation device as recited in claim 1, wherein means for determining drag of the mobile portion of the asynchronous motor are connected intermediate the means for controlling the exitation current and the means for comparing actual speed with the index value.

6. A regulation device as recited in claim 1, wherein means for determining acceleration of the mobile portion of the asynchronous motor are connected intermediate the means for controlling the exitation current and the means for comparing actual speed with the index value.

7. A regulation device as recited in claim 1, wherein means for detecting currents at the AC generator output are connected intermediate the means for controlling the exitation current and the means for comparing actual speed with the index value.

8. A regulation device as recited in claim 7, wherein the means for detecting currents comprise means for detecting instaneous currents and means for determining the average effective value of these currents.

* * * * *